United States Patent [19]
Funada et al.

[11] 4,336,980
[45] Jun. 29, 1982

[54] FLUORESCENT LIQUID CRYSTAL DISPLAY DEVICES

[75] Inventors: Fumiaki Funada, Yamatokoriyama; Masataka Matsuura, Tenri; Tomio Wada, Nara, all of Japan

[73] Assignee: Sharp Kabushiki Kaisha, Osaka, Japan

[21] Appl. No.: 120,994

[22] Filed: Feb. 13, 1980

[30] Foreign Application Priority Data

Feb. 15, 1979 [JP] Japan .................................. 54-16842

[51] Int. Cl.³ ............................................... G02F 1/13
[52] U.S. Cl. .................................. 350/345; 350/350 F
[58] Field of Search ............ 350/340, 345, 346, 350 F, 350/349

[56] References Cited

U.S. PATENT DOCUMENTS

| | | | |
|---|---|---|---|
| 3,960,753 | 6/1976 | Larrabee | 350/345 X |
| 4,208,106 | 6/1980 | Oh | 350/345 |
| 4,211,473 | 7/1980 | Shanks | 350/345 X |

Primary Examiner—F. L. Evans
Attorney, Agent, or Firm—Birch, Stewart, Kolasch & Birch

[57] ABSTRACT

A liquid crystal display device containing a fluorescent material comprises a pair of electrodes, a pair of substrates, and an element for making liquid crystal mixtures in such a molecular orientation that the fluorescent materials generate no fluorescence at a selected portion of the pair of electrodes and accordingly no fluorescence penetrates through the liquid crystal mixtures. The element comprises a liquid crystal molecule orientation layer made of a layer of surfactant or electric power sources. The liquid crystal molecule orientation is formed over the pair of electrodes to produce a homeotropic orientation of a nematic mesophase. The electric power sources are applied to the pair of electrodes to form the homeotropic orientation of the nematic mesophase in a background area of the display device opposed to a display area of it.

3 Claims, 5 Drawing Figures

FLUORESCENT LIQUID CRYSTAL DISPLAY DEVICES

BACKGROUND OF THE INVENTION

The present invention relates to liquid crystal display devices and, more particularly, to fluorescent liquid crystal display devices comprising liquid crystal display materials and fluorescent materials dissolved therein. Light scattering conditions occur within the fluorescent liquid crystal display devices in response to external excitations such as an electric field, whereby visible fluorescence emitted from the fluorescent materials effectively penetrates through the liquid crystal materials.

Generally known as electro-optical effects of liquid crystals are a dynamic scattering effect, twisted nematic electric field effect, guest-host effect, cholesteric-nematic transition effect, etc. These electro-optical effects provide displays by the scattering or absorption of ambient light, as distinct from the effects of luminescent materials which per se produce luminescent displays such as lamp displays, luminescent diode displays, electroluminescence displays, plasma displays or the like. The displays resorting to the electro-optical effects are advantageous over those of the latter type in that they involve reduced energy consumption but have the drawback of lacking brilliance.

The present invention has overcome the above problem and provides novel useful display devices which have the low power consumption characteristics of so-called passive displays not luminescent in themselves and which incorporate a self-luminescent component for giving a brilliant active display.

R. D. Larrabee has already proposed to add a fluorescent material to a liquid crystal material and vary the fluorescent intensity of the material by electric field (RCA Review, Vol. 34, P 329, 1973). However, this paper states that he failed to find liquid crystal materials which do not absorb ultraviolet light at room temperature. This appears attributable to the fact that when causing a fluorescent material in a liquid crystal material to absorb a varying amount of light in accordance with the orientation of the liquid crystal to vary the fluorescence intensity with the light absorption, the exciting light is absorbed by the liquid crystal layer without effectively exciting the fluorescent material.

U.S. Pat. No. 3,844,637 discloses fluorescent liquid crystal compositions comprising 4'-methoxy-(or -ethoxy-) benzylidene-4-n-butylaniline as a liquid crystal material. However, the compositions per se absorb violet light or near ultraviolet light without permitting effective excitation of the fluorescent material.

OBJECTS AND SUMMARY OF THE INVENTION

In view of the foregoing, it is an object of the present invention to provide novel luminescent display devices of the low power consumption type with use of liquid crystal materials which cause a light scattering phenomena in response to external stimulation of an electric field, a magnetic field, thermal excitation or mechanical force in any one of the nematic, smectic, and cholesteric mesophases.

It is another object of the present invention to provide novel luminescent display devices of the low power consumption type with the use of liquid crystal materials.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a liquid crystal display device containing a fluorescent material comprises a pair of electrodes, a pair of substrates, and an element for making liquid crystal mixtures in such a molecular orientation that the fluorescent material generates no fluorescence at a selected portion of the pair of electrodes and accordingly no fluorescence penetrates through the liquid crystal mixtures.

The element comprises a liquid crystal molecule orientation layer made of a layer of surfactant or electric power sources. The liquid crystal molecule orientation is formed over the pair of electrodes to produce a homeotropic orientation of a nematic mesophase. The electric power sources are applied to the pair of electrodes to form the homeotropic orientation of the nematic mesophase in a background area of the display device opposed to a display area of it.

BRIEF DESCRIPTION OF THE DRAWINGS

The present invention will become more fully understood from the detailed description given hereinbelow and accompanying drawings which are give by way of illustration only, and thus are not limitative of the present invention and wherein.

DESCRIPTION OF THE INVENTION

Figure 1:
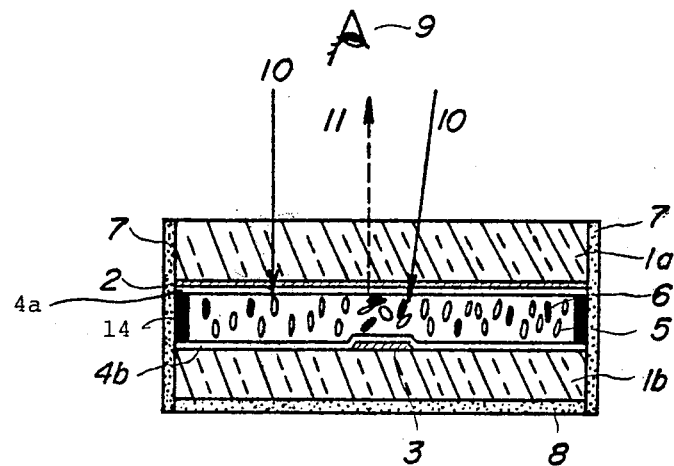
FIG. 1 is a sectional view of a reflective type of fluorescent liquid crystal display device according to the present invention.

The present invention is characterized in that the liquid crystal material adapted to the present invention causes a light scattering phenomena in response to external excitation of an electric or magnetic field, thermal increase, or a mechanical shock, irrespective of its mesophase such as nematic, cholesteric, or smectic. More particularly, for example, the light scattering phenomena are: (1) a dynamic scattering mode of the liquid crystal materials where an electrolyte such as quarternary Anmonium salt is added to the nematic liquid crystal materials with a negative dielectric anisotropy; (2) a memory effect of the mixed liquid crystal material comprising the nematic and cholesteric liquid crystal materials; and (3) a phase transition effect that the liquid crystal material causes the transformation from the Grandjean textures of the cholesteric mesophase to the focal-conic textures of the same and finally to the nematic mesophase.

The liquid crystal materials adapted to the fluorescent liquid crystal display device contain individually or in combination various additives for giving a predetermined conductivity, activating agents for controlling pitches of the cholesteric mesophase, or orientation agents for causing the orientation of the liquid crystal materials.

The present invention is featured by allowing an organic fluorescent material to be dissolved or disposed in a liquid crystal material. The liquid crystal material exhibits light scattering phenomena in response to exciting means to propagate both incident light for the fluorescent material and fluorescence developed from the same. A cell is provided for containing the liquid crystal material in film conditions. A display area of the cell makes it possible to propagate the incident light and the fluorescence.

Examples of suitable liquid crystal materials adapted to the present invention are as follows in their molecular formula:

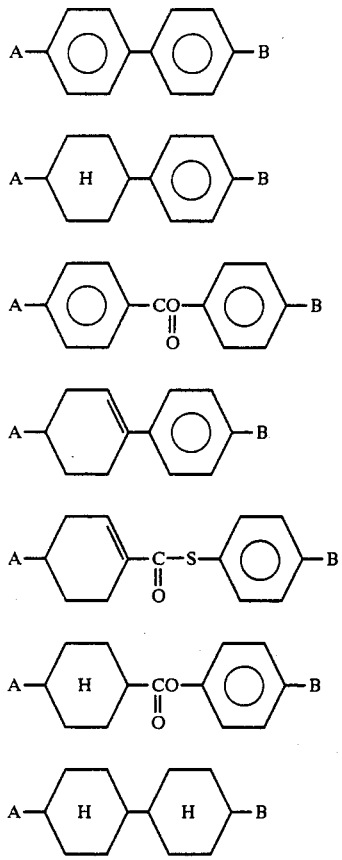

In the above molecular formula, A and B individually represent alkyl, alkoxy, alkoxycarbonyl, or cyano groups. Useful liquid crystal materials are not limited to these examples.

The fluorescent materials adapted to the present invention should be easily dissolved or dispersed in a liquid crystal material. The fluorescent materials must generate fluorescence with efficiency in response to the excitation applied thereto. It is desirous that the fluorescent materials provide a high degree of pleochroism. The light emission properties of the fluorescent materials should not be damaged by the excitation radiation.

Examples of fluorescent materials useful in this invention are usually aromatic compounds such as anthracene, tetracene, pyrene, Pyronin G, Pyronin B, Rhodamine 6G, perchlorate, cryptocyanine, Coumarin 6, Coumarin 7, Fluorescein, 9, 10-dimethylanthracene, 9, 10-diphenylanthracene, perylene, fluorene, p-quaterphenyl, rubrene, terphenyl, 2,5-diphenylfuran, 2,5-diphenyloxazole, 2-phenyl-5-(4-biphenylyl-1,3,4-oxadiazole, 1,4-bid[2-(5-phenyloxazolyl)] benzene, Samaron Brilliant Yellow H6GL, Brilliant Phosphine, Primulin 0, 1,8-diphenyl-1,3,5,7-octatetracene, Acridine Yellow, Thioflavine S, Phronin GS, 1, 12-benzperylene, etc. Useful materials are not limited to these examples.

It is required that the fluorescent liquid crystal display device containing the liquid crystal materials inclusive of the fluorescent materials pass spectra in the excitation radiation to be applied to the fluorescent materials and spectra in the fluorescence developed from the fluorescent materials.

It may be possible that substrates and electrodes positioned opposite to the display area of the fluorescent liquid crystal display device are made of Al, Cr, Ni, Au or other materials which present the propagation of light.

According to a preferred form of the present invention, a reflective type of fluorescent liquid crystal display device comprising a sandwich-type electrode arrangement with external excitation caused by an electric field will be described.

With reference to FIG. 1, the fluorescent liquid crystal display device comprises a transparent upper substrate 1a, a transparent lower substrate 1b, a display electrode 2, a counter electrode 3, two liquid crystal molecule orientation layers 4a and 4b, liquid crystal materials 5, fluorescent materials 6, and spacers 14.

The transparent upper substrate 1a and the transparent lower substrate 1b are both made of glass, quartz, acrylic resin, polyethylene or the like. The display electrode 2 is patterned desirably. The display electrode 2 is composed of a transparent material such as $In_2O_3$, $SnO_2$, $TiO_2$ or the like. The counter electrode 3 is made of a reflective material such as Al, Au, Cr, Ag or the like. The transparent lower substrate 1b is provided with the spacers 14 made of epoxy resin, silicone resin, frit glass, polymer or the like sheet material to form a container.

The container is filled with the liquid crystal material 5. For example, the liquid crystal material 5 is a liquid crystal mixture of ZLI-926 type produced by Merk and Co., Inc. This type of liquid crystal mixture shows a dynamic scattering mode. For example, the fluorescent materials 6 comprise Coumarin 7 of Eastman Kodak Company. The fluorescent materials 6 are dissolved or dispersed within the nematic liquid crystal materials 5.

The display electrode 2 and the counter electrode 3 in contact with the liquid crystal materials 5 are covered with the liquid crystal molecule orientation layers 4a and 4b.

The liquid crystal molecule orientation layers 4a and 4b comprises a rubbing layer of SiO, $SiO_2$ or the like with a thickness of about 1,000 Å, or a layer of SiO, $SiO_2$ or the like formed by angular deposition, in which case the rubbing layer and the layer of angular deposition are coated by a layer of surfactant having long-chain alkyl or long-chain fluoroalkyl or containing a silane compound having amino group.

The layer of surfactant serves to orient the long axis of liquid crystal molecules perpendicular to the plane of the transparent upper substrate 1a and the lower substrate 1b. The liquid crystal molecule orientation layers 4a and 4b cover a display area provided by the display electrode 2 and a background area surrounding the display area.

An example of such a layer of surfactant is Acid-T which is commercially available from Merk and Co., Inc.

The layer of surfactant serves to provide, as the initial orientation, homeotropic orientation of the molecules in the liquid crystal materials 5 over the display area and the background area in the absence of the external excitation applied to the materials 5. The reason for this homeotropic orientation is that in the absence of the external excitation applied to the liquid crystal materials 5, the fluorescent materials 6 absorb little radiation from the external excitation and accordingly provide little fluorescence because of their pleochroism.

According to the above stated orientation in the liquid crystal molecule containing pleochroism fluorescent materials, little fluorescence is provided over the background area opposed to the display area and the display area because of a thin layer of the liquid crystal materials 5 with a thickness of about 10 $\mu$m and a considerably small amount of fluorescence owing to pleochroism.

When a sufficient amount of an electric field is applied to the display device to cause dynamic scattering mode in the liquid crystal materials 5, the fluorescent materials 6 are accordingly disordered in the display area to the extent that the fluorescent materials 6 absorb sufficient radiation 10 externally applied thereto and therefore generate fluorescence 11 with efficiency through the liquid crystal materials 5. In such a case, it is meant that the fluorescent materials 6 have a large amount of components in line with transition dipole moment in their molecules.

Even if total reflection of fluorescence is produced by the transparent upper substrate 1a and the transparent lower substrate 1b wherein fluorescence is confined within these substrates 1a and 1b, and the liquid crystal materials 5, a considerable amount of the fluorescence is transmitted to a viewer 9 through the display area of the display device because, in light scattering phenomena, the fluorescence is reflected. A counter reflector 8 and two side walls 7 are adhered with the object such that the fluorescence 11 is transmitted to the viewer 9.

Figure 2:
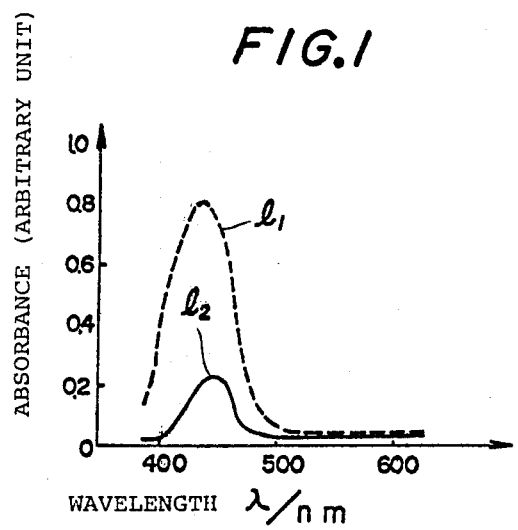
FIG. 2 is a graph showing pleochroism characteristic of Coumarin 7 applied to the fluorescent liquid crystal display device represented in FIG. 1.

FIG. 2 shows a graph representing pleochroism characteristic of Coumarin 7 adapted to the display device shown in FIG. 1. In this instance, Coumarin 7 is solved within liquid crystal mixtures of ZLI-1132 type produced by Merk and Co., Inc. This type of liquid crystal mixture shows a dynamic scattering mode also. The data shown in FIG. 2 are plotted with absorbance (arbitrary unit) as ordinate and wavelength (nm) as abscissa. In FIG. 2, "$l_1$" is the absorption spectrum of the fluorescent material in the direction of the long axis of the liquid crystal molecules and "$l_2$" is the absorption spectrum of that in the direction perpendicular to the long axis of the liquid crystal molecules.

Figure 3:
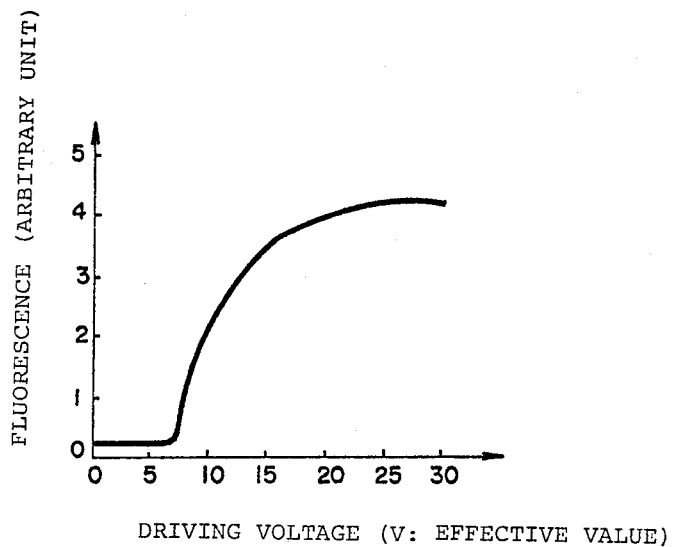
FIG. 3 is a graph showing display contrast properties of fluorescence obtained by the fluorescent liquid crystal display indicated in FIG. 1 against driving voltage.

FIG. 3 shows a graph representing display contrast properties of fluorescence v. driving voltage obtained by the fluorescent liquid crystal display depicted in FIG. 1. The data shown in FIG. 6 are plotted with the strength of the fluorescence (arbitrary unit) as ordinate and driving voltage (volt in effective value) as abscissa. An adequate amount of Coumarin 7 of 0.5 wt % is resolved into the liquid crystal mixtures of ZLI-1132 in which an AC sign wave of 60 Hz is applied to the display cell.

The wavelength of the excitation radiation applied to the display cell is 360 nm and the wavelength of the fluorescence developed is 550 nm.

As shown in FIG. 3, according to the present invention, display elements in the display area are shown in bright illumination and, on the other hand, portions free of the display elements are shown in dark conditions.

In another form of the present invention, cholesteric liquid crystal materials are applied to the display device wherein portions of the light scattering phenomena are placed in focal-conic textures for display purposes and other portions peripheral to the display portions are placed in nematic mesophase in the homeotropic orientation by applying more field to the portion than to the display portions. That is called a transformation type of display cell from the cholesteric mesophase to the nematic mesophase.

Figure 4:
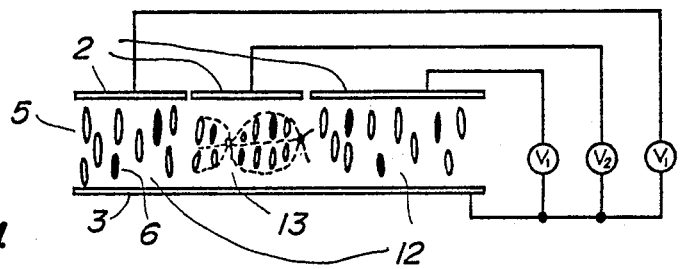
FIG. 4 shows a sectional view of another type of fluorescent liquid crystal display device of the present invention.

FIG. 4 is a schematic representation of such a transformation type of display cell of the present invention. Like elements corresponding to those of FIG. 1 are indicated by like numerals. The magnitude of voltage applied by some driving sources is in the following order.

$$V_1 > V_{th}^{CN} > V_2 > V_{th}^{fc}$$

wherein $V_{th}^{CN}$: a threshold voltage from the cholesteric mesophase to the nematic mesophase, equal to and above which the nematic mesophase is formed.

$V_{th}^{fc}$: a threshold voltage from the focal-conic textures to Grandjean textures, equal to and above which the focal-conic textures are performed.

A typical value of $V_{th}^{CN}$ is in the order of about 15 to 50 V dependent on a sort of liquid crystal material and a thickness of the display cell.

A typical value of $V_{th}^{fc}$ is in the order of about 2 to 5 V dependent on a sort of liquid crystal material.

A portion 12 in the display cell is related to a first kind of display area wherein no display occurs. The liquid crystal materials 5 positioned in the portion 12 are rendered to be the nematic mesophase in the homeotropic orientation. The other portion 13 in the display cell is related to a second kind of display area wherein display occurs. The liquid crystal materials 5 in the portion 13 are rendered to be the cholesteric mesophase in the focal-conic textures as the light scattering phenomena. While the portion 13 is used for the display to be conducted by causing the focal-conic textures of the cholesteric mesophase therein, the portion 12 is used to ensure that little fluorescence is penetrated through the liquid crystal materials 5 by causing the nematic mesophase in the homeotropic orientation.

A kind of display electrode 2 provided near the portion 13 functions as an electrode providing an indication. Another kind of display electrode 2 provided near the portion 12 acts as a background electrode providing a background for the indication produced in the portion 13.

Figure 5:
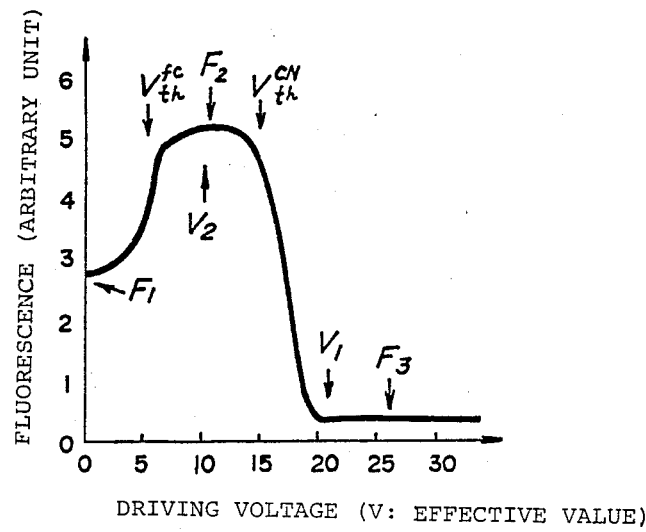
FIG. 5 is a graph representing display contrast properties of fluorescence v. driving voltage caused by the fluorescent liquid crystal display device shown in FIG. 4.

FIG. 5 shows a graph designating display contrast properties of fluorescence v. driving voltage performed in the fluorescent liquid crystal display in FIG. 4. The ordinate of the graph shown in FIG. 5 is the strength of the fluorescence (arbitrary unit) and the abscissa is driving voltage (volt in effective value). The cholesteric liquid crystal applied is type 605 produced by Hoffmann-La Roche Inc. added by cholestryl nonanoate of 10 wt %. Coumarin 7 of 1 wt % is added as pleochroism fluorescent materials. Experimental conditions are that the thickness of the display cell is 10 μm, the temperature is kept 20° Centigrade, the wavelength of the excitation radiation is 360 nm, and the wavelength of the fluorescence is 550 nm.

In FIG. 5, a numeral $F_1$ is related to the Grandjean textures in the cholesteric mesophases, a numeral $F_2$ is related to the focal-conic textures in the cholesteric mesophase, and a numeral $F_3$ represents the homeotropic orientation in the nematic mesophase.

Although this invention has been described above as embodied in the form of display devices of the reflecting type, the invention can be embodied as those of the permeable type in which the electrodes and substrates are all transparent and which may be advantageously used in combination with an exciting light source.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A transformation-type display device comprising liquid crystal mixtures inclusive of a fluorescent material comprising:

a pair of electrodes;
   a pair of substrates, each carrying one of said electrodes;
   A liquid-crystal mixture containing fluorescent material dissolved or dispersed therein supported by said pair of substrates, said liquid-crystal mixture comprising a cholesteric liquid-crystal material formed in focal-conic textures in a cholesteric mesophase at a display area and in homeotropic orientation in a nematic mesophase at a background area opposed to said display area; and
   means for placing said liquid-crystal mixture in such a molecular orientation that, in a selected portion of the pair of electrodes, the fluorescent material generates no fluorescence and, accordingly, no fluorescence penetrates through the liquid-crystal mixture.

2. The display device as set forth in claim 1, wherein the placing means comprises a driving voltage source applied to the pair of electrodes, where a display electrode is controlled by a source having a lower voltage than a voltage applied to a background electrode, the display electrode being activated for providing an indication and the background electrode being activated for providing a background for the indication.

3. The display device as set forth in claim 2, wherein the voltage applied to the display electrode is between a threshold voltage from focal-conic textures to Grandjean textures and another threshold voltage from the cholesteric mesophase to the nematic mesophase, and the voltage applied to the background electrode is equal to or above the latter threshold voltage.

* * * * *